United States Patent [19]

Kataoka et al.

[11] Patent Number: 5,402,409
[45] Date of Patent: Mar. 28, 1995

[54] OPTICAL RECORDING APPARATUS AND METHOD FOR ADDING INFORMATION IN A SUB-SCANNING DIRECTION AND FOR DEFLECTING A LIGHT BEAM TO AN OPTIMUM SUB-SCANNING RECORDING POSITION

[75] Inventors: Keiji Kataoka; Susumu Saito; Yasuyuki Tsuji; Shuuho Yokokawa; Kunitomo Takahashi; Tsukasa Ogawa; Youji Hirose; Hiroshi Ueno, all of Katsuta, Japan

[73] Assignee: Hitachi Koki Co., Ltd., Tokyo, Japan

[21] Appl. No.: 92,898

[22] Filed: Jul. 19, 1993

[30] Foreign Application Priority Data

Jul. 17, 1992 [JP] Japan .................. 4-190755

[51] Int. Cl.[6] .................................. G01D 9/42
[52] U.S. Cl. .................. 369/124; 346/106; 358/296; 358/398; 347/255
[58] Field of Search .............. 358/296, 300, 298; 359/196, 201, 206; 346/108, 106; 369/124

[56] References Cited

U.S. PATENT DOCUMENTS

| | | | |
|---|---|---|---|
| 4,038,668 | 7/1977 | Quarton | 346/110 R |
| 4,841,135 | 6/1989 | Goto et al. | 359/218 |
| 5,045,869 | 9/1991 | Isaka et al. | 346/108 |
| 5,134,426 | 7/1992 | Kataoka et al. | 346/108 |
| 5,134,495 | 7/1992 | Frazier et al. | 346/108 |
| 5,182,575 | 1/1993 | Kato et al | 346/108 |
| 5,210,545 | 5/1993 | Tomita | 346/108 |
| 5,305,022 | 4/1994 | Ota et al. | 346/108 |
| 5,309,177 | 5/1994 | Shoji et al. | 346/108 |
| 5,323,183 | 6/1994 | Tateoka et al. | 346/108 |

FOREIGN PATENT DOCUMENTS 3131818  6/1991  Japan .

Primary Examiner—Georgia Y. Epps
Assistant Examiner—Kim-Kwok Chu
Attorney, Agent, or Firm—Sughrue, Mion, Zinn Macpeak & Seas

[57] ABSTRACT

A method of optically recording original information supplied from information generating device on an optical recording material in an optical recording apparatus, comprising the steps of: generating, from the original information, interpolating information which is to be interpolated in a sub-scanning direction of the optical recording material; and optically recording the interpolating information in the sub-scanning direction by a plurality of laser beams.

7 Claims, 6 Drawing Sheets

OPTICAL RECORDING APPARATUS AND METHOD FOR ADDING INFORMATION IN A SUB-SCANNING DIRECTION AND FOR DEFLECTING A LIGHT BEAM TO AN OPTIMUM SUB-SCANNING RECORDING POSITION

BACKGROUND OF THE INVENTION

1. Field of the Invention

This invention relates to an optical recording method, and more particularly to an optical recording method which is useful for a laser printer.

2. Discussion of the Related Art

FIG. 11 is a diagram showing the configuration of a conventional optical recording apparatus. In FIG. 11, a laser beam 2 emitted from a laser light source 1 is modulated by an acoustooptic light modulator (hereinafter abbreviated as "AO light modulator") 4. Then, the modulated laser beam is directed through a scanning lens 7 by a rotary polygon mirror 6 to a photoconductive drum 9, so as to optically scan the drum 9 in the direction of arrow 10. To the AO light modulator 4, optical recording information is supplied from a computer 137 through a control circuit 13 and a light modulator driving circuit 12. On the basis of the optical recording information, the AO light modulator 4 optically modulates the intensity of the laser beam. A photodetector 8 detects part of the scanning light and transmits a synchronizing signal to the control circuit 13. The photoconductive drum 9 rotates in the direction of arrow 11 (i.e., in the sub-scanning direction), so that optical recording is effected by the laser beam on the entire surface of the photoconductive drum 9.

In general, optical recording information supplied from the computer 137 is recorded at recording positions arranged at regular pitches in both the main scanning and sub-scanning directions. Thus, when an oblique straight line which is closely perpendicular to scanning lines 15 is to be printed, the resultant printed line is irregular or in the form of a series of steps, exhibiting poor printing quality, as shown in FIG. 12(A). In FIG. 12(A), reference numeral 14 designates optically recorded dots, and 16 designates recording pitches in the main scanning direction. When the pitches in the main scanning and sub-scanning directions are small, high-quality printing can be attained. However, the provision of such small pitches increases the volume of the information for printing, thereby increasing the cost of the entire system. In one of the methods which solve this problem, when an oblique straight line closely perpendicular to the scanning lines 15 is to be printed, the control circuit itself checks the contents of original information, and then controls the recording timing to be delayed or advanced, based on the judgment of the control circuit, so that the recording positions are shifted in the main scanning direction, thereby attaining a smooth and straight oblique line as shown in FIG. 12(B). This method is effective in recording an oblique straight line closely perpendicular to the scanning lines.

However, the above method is not effective in recording an oblique straight line closely parallel to the scanning lines 15, as shown in FIG. 13. More specifically, the recorded line is irregular in the form of a series of steps. Thus, the method involves a problem that there is no possibility of improvement in printing quality.

In order to solve this problem, Japanese Laid-open Patent Publication No. Hei 3-131818 has proposed an image forming apparatus in which, when a laser beam is deflected in the main scanning direction, the laser spot is simultaneously shifted every other dot by a minute distance in the sub-scanning direction, thereby increasing the dot density in the sub-scanning direction and reducing the degree of irregularity or step difference in the oblique line to be recorded.

In the proposed apparatus, however, a laser spot is always shifted every one dot in the sub-scanning direction, and therefore the dot density in the scanning direction is reduced, and such an effect that step difference in the oblique line is reduced may become small or lowered.

SUMMARY OF THE INVENTION

Accordingly, it is an object of the invention to reduce the degree of irregularity or step difference in an oblique line to be recorded which is closely parallel to scanning lines, thereby enabling a smooth straight line to be recorded and improving the printing quality of an optical recording apparatus.

The object of the invention is attained by using original information supplied from information generating means to generate interpolating information which is to be interpolated in the sub-scanning direction of an optical recording material, and thereafter by recording the interpolating information in the sub-scanning direction by a plurality of laser beams.

The object of the invention is attained also by determining, on the basis of original information supplied from information generating means, an optimum sub-scanning position for the optical recording on the optical recording material, and thereafter by deflecting a laser beam in the sub-scanning direction to perform optical recording at the optimum sub-scanning position.

According to the invention, information to be interpolated in the sub-scanning direction of the optical recording material is generated from original information, or an optimum sub-scanning position for the recording on the optical recording material is determined on the basis of the original information so that a laser beam is deflected in the sub-scanning direction on the basis of the determination. Therefore, light spots can be recorded at positions other than those on the scanning lines. This makes it possible to obtain a smooth oblique line also in the case where an oblique line closely parallel to the scanning lines is to be printed.

DETAILED DESCRIPTION OF THE PREFERRED EMBODIMENTS

Embodiments of the present invention will be described with reference to the accompanying drawings.

Figure 2:
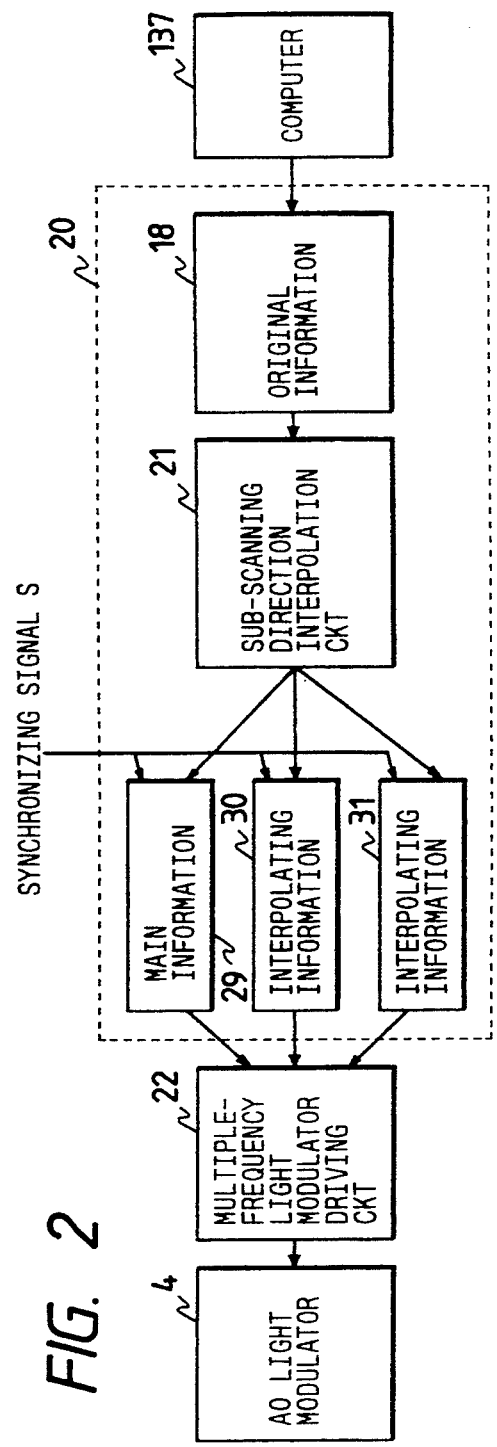
FIG. 2 is a block diagram showing the flow of optical recording information in FIG. 1.

FIG. 2 is a block diagram showing the flow of optical recording information in an optical recording method according to the invention. From original information 18 sent from a computer 137, a sub-scanning direction interpolation circuit 21 in a control circuit 20 generates information which is to be interpolated in the sub-scanning direction so as to effectively attain an oblique straight line.

Figure 3:
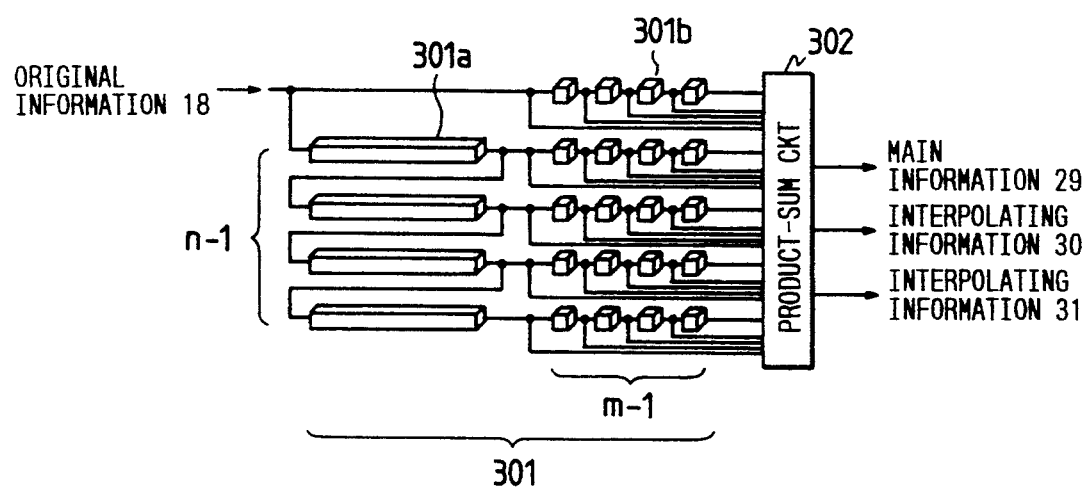
FIG. 3 is a diagram showing the configuration of a sub-scanning direction interpolating circuit.
Figure 4:
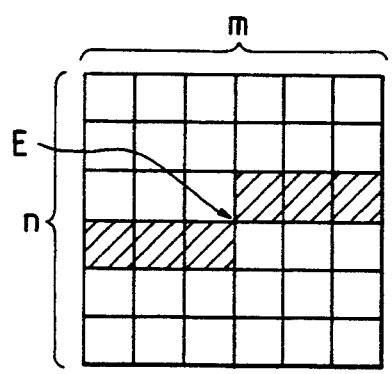
FIG. 4 is a diagram showing one example of original information stored in the sub-scanning direction interpolating circuit of FIG. 3.

As shown in FIG. 3, the sub-scanning direction interpolation circuit 21 includes a two-dimensional local memory 301 and a product-sum circuit 302 such as a pattern matching circuit. The two-dimensional local memory 301 is constituted by a plurality of line memories 301a and a plurality of shift registers 301b. The original information 18 transmitted from the computer 37 is sequentially stored in the line memories 301a and also inputted into the shift registers 301b, whereby (n X m) information (hereinafter referred to as "window information") shown in FIG. 4 is extracted. The window information is what is partially sequentially formed by part of the two-dimensional information which is optically recorded on a photosensitive drum. The n X m window is relatively moved with respect to the two-dimensional information, thereby detecting an edge portion E within the information as shown in FIG. 4. This window information is compared with a reference pattern which has previously been prepared in the product-sum circuit 302, and a piece of main information 29 and two pieces of interpolating information 30 and 31 are generated according to the comparison result. That is, in the example shown in FIG. 2, the triple interpolation is performed, or three pieces of information are generated from the original information. The three pieces of information are synchronized by a synchronizing signal S, and then transmitted to a multiple-frequency light modulator driving circuit 22 which in turn drives an AO light modulator 4.

Figure 5:
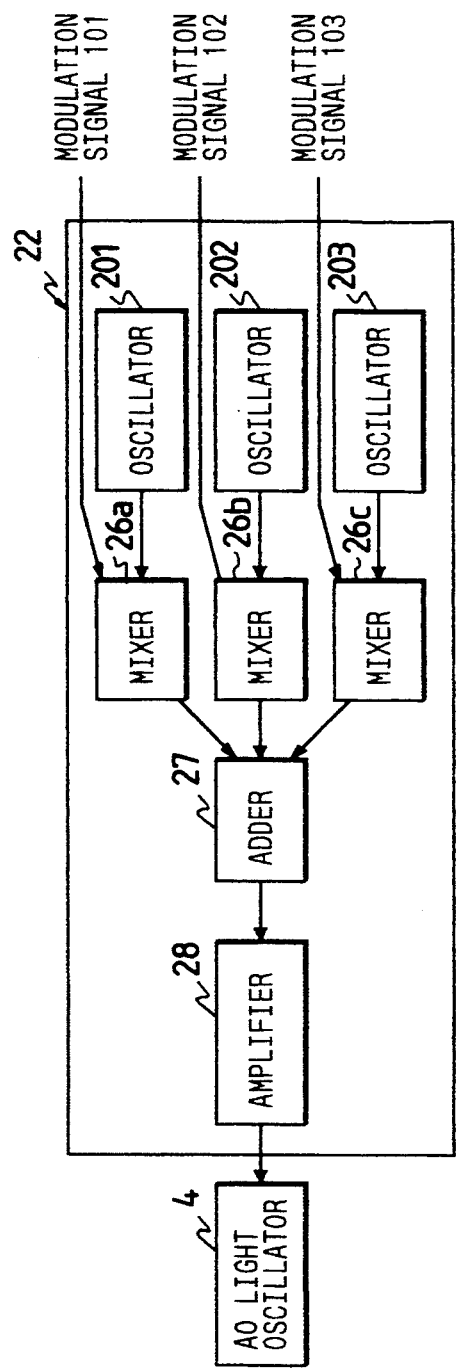
FIG. 5 is a block diagram showing the configuration of multiple-frequency light modulator driving circuit.

FIG. 5 is a block diagram showing the configuration of the multiple-frequency light modulator driving circuit 22. The three kinds of information described in conjunction with FIG. 2, i.e., the main information 29 and the two pieces of interpolating information 30 and 31 are transmitted as modulation signals 101, 102 and 103 to mixers 26a, 26b and 26c, respectively. Oscillators 201, 202 and 203 oscillate at different high frequencies which are set at such levels as to produce ultrasonic waves in the AO light modulator 4. In the mixers 26, these oscillation signals are subjected to the amplitude modulation by the respective modulation signals 101, 102 and 103. The modulated signals are added together by an adder 27, and then amplified by an amplifier 28. The amplified signal is supplied to the AO light modulator 4.

Figure 1:
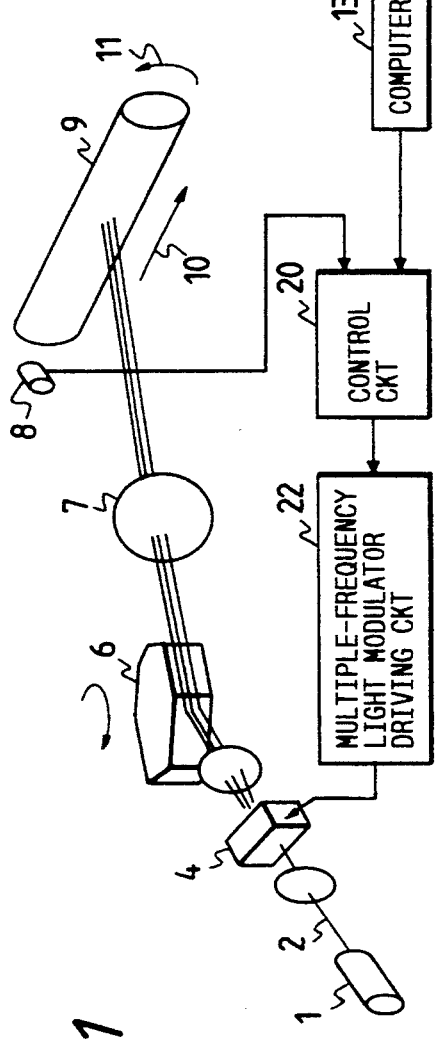
FIG. 1 is a diagram showing the configuration of an embodiment of the optical recording method according to the invention.

FIG. 1 is a diagram showing the configuration of an optical recording apparatus to which the method of the invention is applied. A laser beam 2 emitted from a laser light source 1 enters the AO light modulator 4. The AO light modulator 4 then emits three laser beams diffracted at different angles which respectively correspond to the oscillation frequencies of the oscillators 201, 202 and 203 shown in FIG. 5. Accordingly, the laser beams which are optically modulated on the basis of the respective modulation signals 101, 102 and 103 shown in FIG. 5 form images at different positions on a photoconductive drum 9 which are shifted from each other in the sub-scanning direction.

Figure 6:
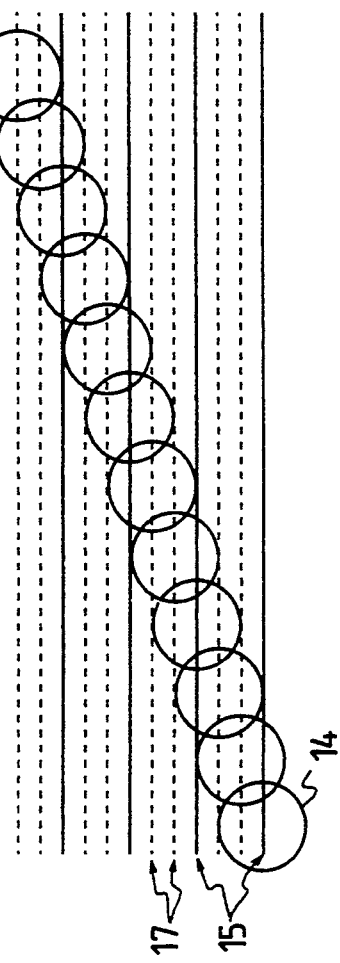
FIG. 6 is a diagram showing an example of a line printed by the method of the invention.

FIG. 6 shows an example of an oblique straight line closely parallel to the scanning lines which oblique line has been printed by the optical recording method according to the invention. This oblique line is smooth and straight, as compared with a printed line of the prior art shown in FIG. 13. Unlike the conventional optical recording apparatus which effects recording only on the scanning lines 15, the optical recording apparatus using the method of the invention can effect recording also on interpolation scanning lines 17, thereby attaining improvement in the printing quality.

In the example shown in FIG. 1, multiple frequencies are applied to the AO light modulator 4 to produce a plurality of modulated laser beams. Alternatively, such a plurality of modulated laser beams may be produced by other means such as a semiconductor laser array device.

Figure 7A:
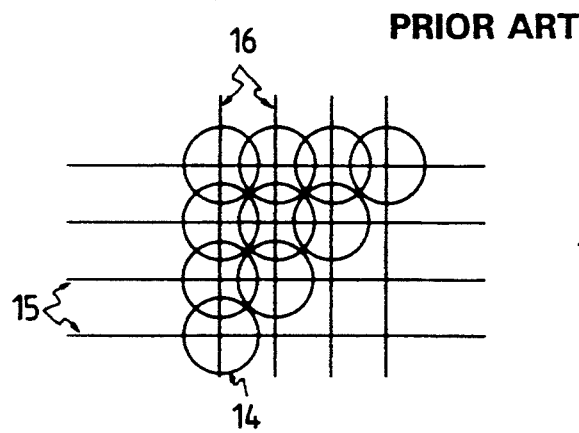
FIGS. 7(A) and 7(B) are diagrams showing an example of a pattern printed by the methods of the prior art and the invention, respectively.
Figure 7B:
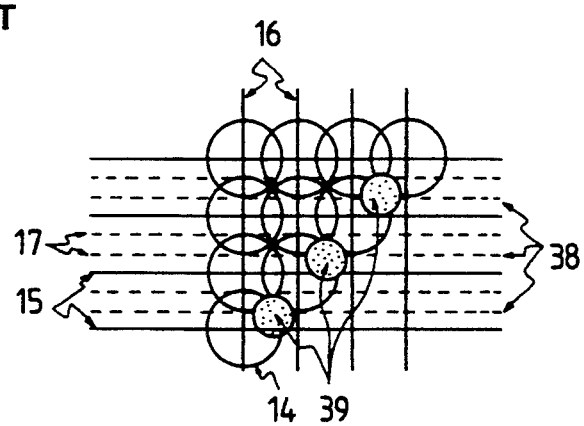

FIGS. 7(A) and 7(B) show examples of a printed triangular pattern. FIG. 7(A) shows an example of the pattern printed by the conventional apparatus which effects printing only on the scanning lines 15. There is noticeable unevenness in the oblique line of this printed triangular pattern. FIG. 7(B) shows an example of a triangular pattern printed by the optical recording method according to the invention in which the degree of unevenness in the oblique line is significantly reduced. This means that a smoother oblique line can be printed by the method of the invention. In the printing of this pattern, the main information shown in FIG. 2 is the same as the original information 18 sent from the computer 137. In addition to this main information, interpolating information is generated by the sub-scanning direction interpolation circuit 21, so that interpolation dots 39 are printed on interpolation scanning lines 38. In this example, each of the interpolation dots 39 is printed between two adjacent recording positions 16 in the main scanning direction, and adjusted so as to be smaller in size. In order to obtain a smaller dot size, the voltage level of a signal to be applied to the light modulator 4 is made lower so that the intensity of a laser beam emitted from the light modulator 4 becomes smaller.

In the above-described embodiment of the invention, two interpolation scanning lines are provided for each scanning line. But it should be understood that a single interpolation scanning line may be provided for each scanning line.

Figure 8:
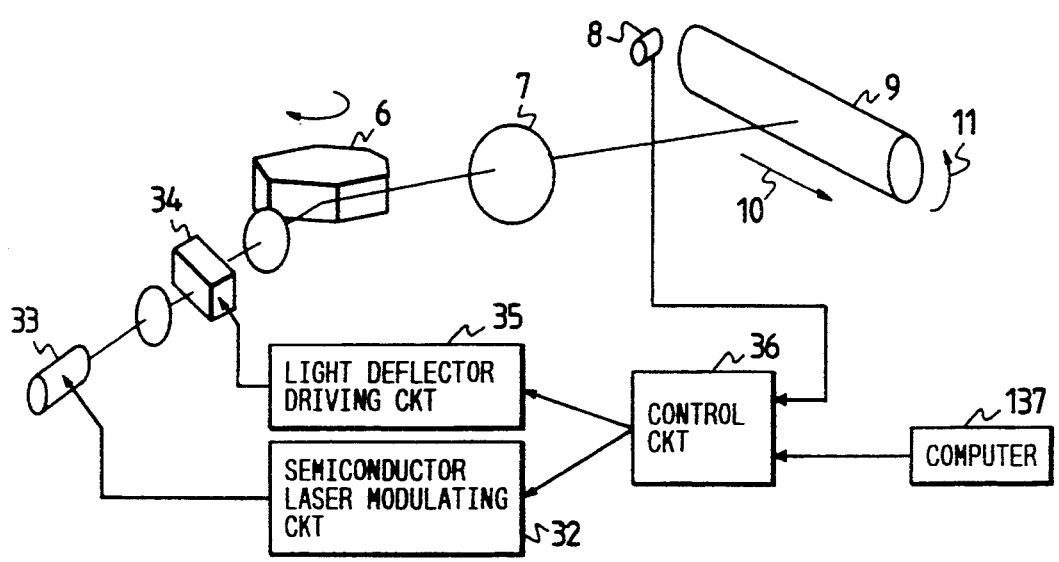
FIG. 8 is a diagram showing the configuration of another embodiment of the optical recording method according to the invention.
Figure 9:
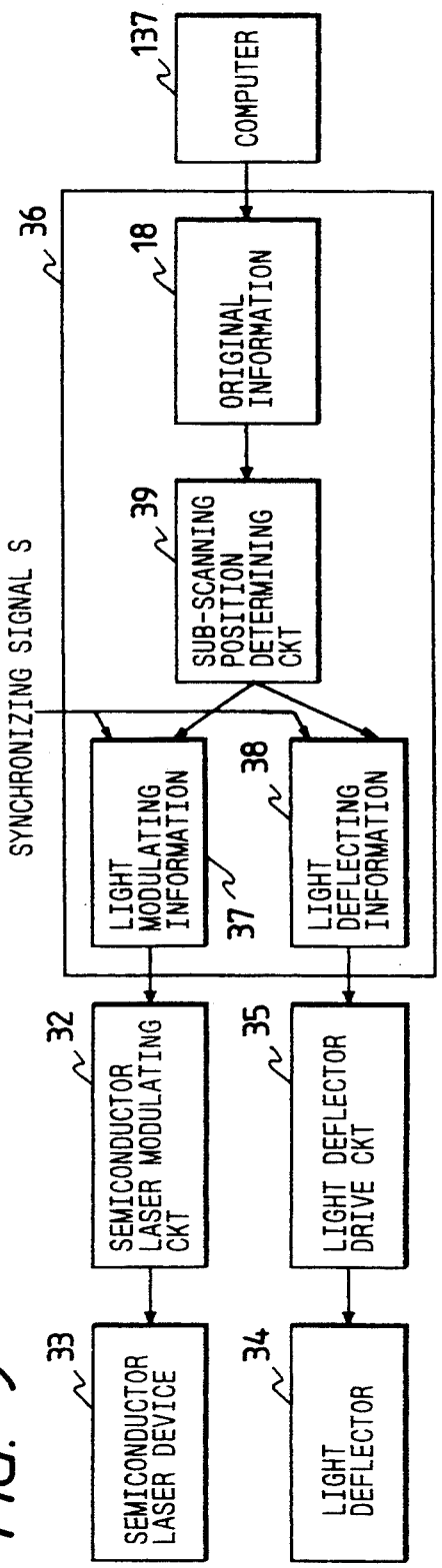
FIG. 9 is a block diagram showing the flow of optical recording information in FIG. 8.

FIGS. 8 and 9 are diagrams showing the optical recording method according to another embodiment of the invention. FIG. 9 is a block diagram showing the flow of optical recording information. In FIG. 9, from original information 18 sent from a computer 137, a sub-scanning position determining circuit 39 generates optimum light modulating information 37 which is effective in attaining an oblique straight line, and also light deflecting information 38 which corresponds to an optimum shift of the recording position in the sub-scanning direction.

Figure 10:
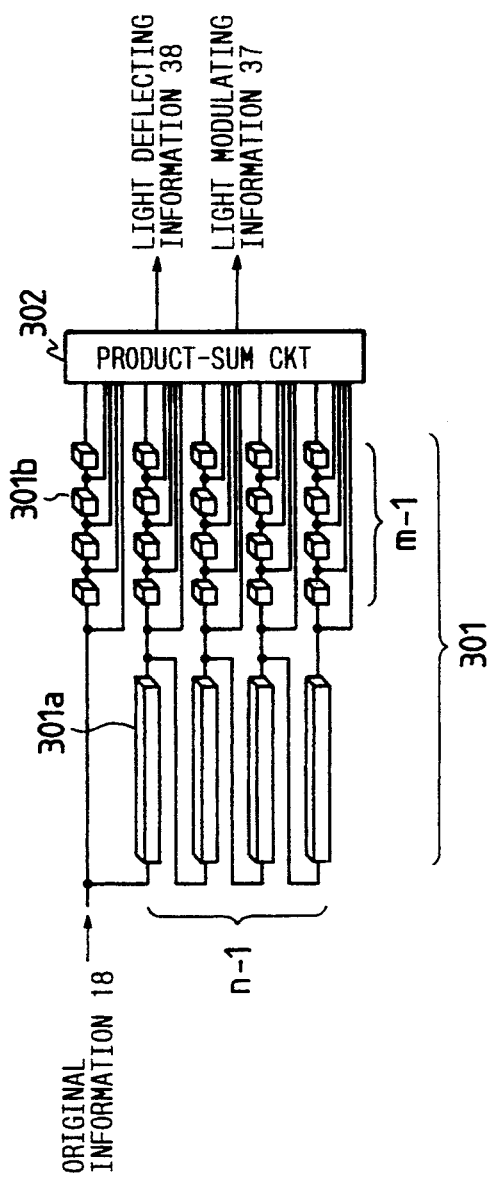
FIG. 10 is a diagram showing the configuration of a sub-scanning position determining circuit.
Figure 11:
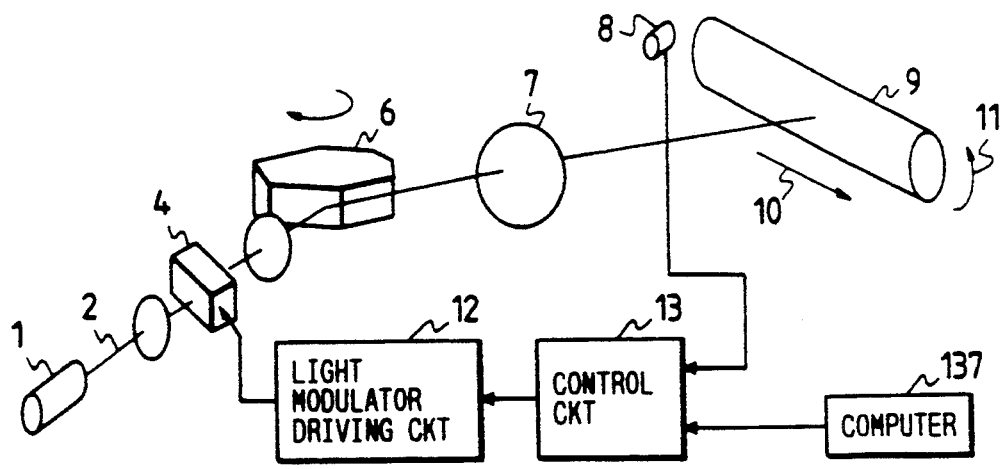
FIG. 11 is a diagram showing the configuration of a conventional optical recording apparatus.
Figure 12A:
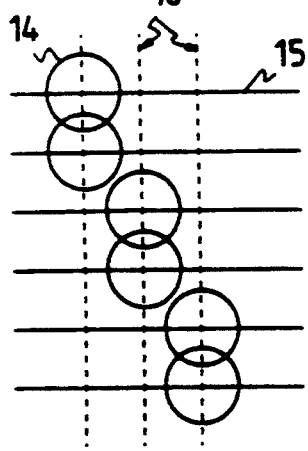
FIGS. 12(A) and 12(B) are diagrams showing examples of a line printed by the conventional apparatus.
Figure 12B:
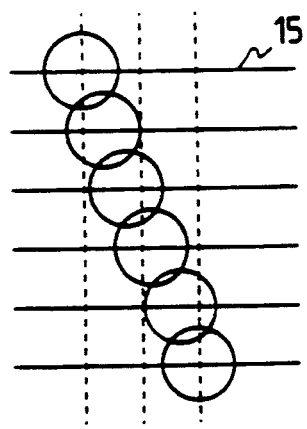

The structure of the sub-scanning position determining circuit 39 is the same as that of the above-mentioned sub-scanning direction interpolation circuit 21, in which window information is compared with a reference pattern. In the sub-scanning position detecting circuit 39, arbitrary light deflection position necessary for smooth printing is determined in accordance with the comparison result, thereby generating the light deflecting information 38 and the light modulating information 37 as shown in FIG. 10. On the basis of the light modulating information 37, a semiconductor laser modulating circuit 32 modulates a laser beam to be emitted from a semiconductor laser device 33. On the basis of the light deflecting information 38, a light deflector driving circuit 35 drives a light deflector 34 for deflecting the laser beam in the sub-scanning direction. The light modulating information 37 and the light deflecting information 38 are synchronized by the synchronizing signal S.

FIG. 8 is a diagram showing the configuration of an optical recording apparatus. A laser beam emitted from the semiconductor laser device 33, while being modulated by the semiconductor laser modulating circuit 32, enters the light deflector 34. The light deflector 34 optically deflects at a high speed the laser beam to a predetermined position in the sub-scanning direction, on the basis of the light deflecting information sent from a control circuit 36. As the light deflector, a deflector utilizing the electrooptic effect may be used.

Figure 13:
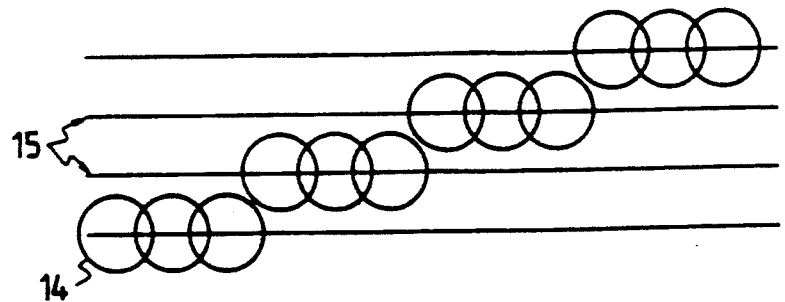
FIG. 13 is a diagram showing an example of a line printed by the conventional apparatus.

Also in this embodiment, in the printing of an oblique straight line closely parallel to the scanning lines, it is possible to print a line such as shown in FIG. 6 which is smooth and straight as compared with the example of a conventional printed line shown in FIG. 13.

According to the invention, in the printing of an oblique line closely parallel to the scanning lines, a smooth oblique line without unevenness or irregularity can be printed from a small volume of original information, whereby the printing quality is improved.

What is claimed is:

1. A method for optically recording information supplied from information generating means onto an optical recording material in an optical recording apparatus by irradiating said optical recording material with a light source which forms beam spots corresponding to printed dots on said optical recording material, said method comprising the steps of:
   receiving original information from said information generating means;
   generating, based on said original information, interpolation information corresponding to additional printed dots which are to be interpolated between scanning lines in a sub-scanning direction of said optical recording material; and
   optically recording said original information and said interpolation information in said sub-scanning direction by irradiating said optical recording material with said light source.

2. The method as claimed in claim 1, further comprising the steps of:
   producing multiple frequency signals in accordance with said original information and said interpolation information; and
   modulating said multiple frequency signals into a plurality of modulated laser beams, wherein said original information and said interpolation information are optically recorded on said optical recording material by irradiating said plurality of modulated laser beams onto said optical recording material.

3. A method for optically recording information supplied from information generating means onto an optical recording material in an optical recording apparatus by irradiating a photoreceptive member with a laser beam to form beam spots on said photoreceptive member, said method comprising the steps of:
   receiving original information;
   determining, based on said original information, an optimum recording position in a sub-scanning direction for each beam spot required to optically record said original information; and
   selectively deflecting selected ones of said beam spots irradiated by said laser beam in said sub-scanning direction from an original position to said optimum recording position to optically record said original information.

4. The method as claimed in claim 3, wherein said determining step comprises generating light deflecting information corresponding to said optimum recording position in said sub-scanning direction, and light modulating information representative of a dot size to be printed.

5. An optical recording apparatus for optically recording information onto an optical recording medium by irradiating said optical recording medium with a laser beam which forms beam spots corresponding to printed dots on said optical recording medium, said optical recording apparatus comprising:
   a laser light source;
   information means for receiving original information and for producing, based on said original information, main information and interpolation information representative of additional printed dots to be interpolated between scanning lines a sub-scanning direction of said optical recording medium;
   light modulation means for modulating said laser beam emitted from said laser light source based on said main information and said interpolation information received from said information means to produce a modulated laser beam; and
   means for scanning said optical recording medium by said modulated laser beam to record said main information and said interpolation information onto said optical recording medium.

6. An optical recording apparatus, comprising:
   a light source;
   receiving means for receiving original information;
   information means for producing, based on said original information, first information representative of an intensity of a laser beam emitted by said light source corresponding to a dot-size to be recorded, and second information representative of a sub-scanning position of said laser beam;
   control means for controlling said light source to emit a laser beam according to said first information received from said information means;
   means for deflecting said laser beam from said light source according to said second information to produce a modulated laser beam; and
   means for scanning an optical recording medium by said modulated laser beam to optically record said original information onto said optical recording medium.

7. An optical recording apparatus for optically recording information onto an optical recording medium by irradiating said optical recording medium with a light source which forms beam spots corresponding to printed dots on said optical recording medium, said optical recording apparatus comprising:

a laser light source;

information means for receiving original information and for producing, based on said original information, main information and interpolation information representative of additional printed dots to be interpolated between scanning lines in a sub-scanning direction of said optical recording medium;

multiple-frequency light modulation means for producing multiple frequency signals in accordance with said main information and said interpolation information, respectively, and for modulating said multiple frequency signals into respective modulated laser beams; and means for scanning said optical recording medium by said respective modulated laser beams to optically record said main information and said interpolation information onto said optical recording medium.

* * * * *